United States Patent
Demonsant et al.

(10) Patent No.: US 12,141,157 B2
(45) Date of Patent: *Nov. 12, 2024

(54) ENHANCED MECHANISMS FOR MANAGING MULTIDIMENSIONAL DATA

(71) Applicant: Planisware SAS, Châtillon (FR)

(72) Inventors: Pierre Demonsant, Paris (FR); Mathieu Gautier, Paris (FR); Thibault Roche, Paris (FR); Baptiste Henriquez, San Francisco, CA (US)

(73) Assignee: Planisware SAS, Chatillon (FR)

( * ) Notice: Subject to any disclaimer, the term of this patent is extended or adjusted under 35 U.S.C. 154(b) by 66 days.

This patent is subject to a terminal disclaimer.

(21) Appl. No.: 17/516,558

(22) Filed: Nov. 1, 2021

(65) Prior Publication Data

US 2022/0129476 A1    Apr. 28, 2022

Related U.S. Application Data

(63) Continuation of application No. 15/730,639, filed on Oct. 11, 2017, now Pat. No. 11,204,934, which is a
(Continued)

(51) Int. Cl.
*G06F 16/25* (2019.01)
*G06F 16/27* (2019.01)
(Continued)

(52) U.S. Cl.
CPC .......... *G06F 16/254* (2019.01); *G06F 16/275* (2019.01); *G06F 16/283* (2019.01); *G06F 16/284* (2019.01); *G06F 40/18* (2020.01)

(58) Field of Classification Search
CPC .... G06F 16/254; G06F 16/275; G06F 16/283; G06F 16/284
See application file for complete search history.

(56) References Cited

U.S. PATENT DOCUMENTS 5,623,591 A     4/1997   Cseri
6,006,239 A *  12/1999   Bhansali ................ G06Q 10/10
(Continued)

FOREIGN PATENT DOCUMENTS

| WO | 03032125 A2 | 4/2003 |
| WO | 2010031081 A2 | 3/2010 |
| WO | 2017003810 A1 | 1/2017 |

OTHER PUBLICATIONS

Witkowski et al., "Spreadsheets in RDBMS for OLAP", SIGMOD '03: Proceedings of the 2003 ACM SIGMOD International Conference on Management of Data, Jun. 2003, pp. 52-63, https://doi.org/10.1145/872757.872767 (Year: 2003).*
(Continued)

*Primary Examiner* — Tony Mahmoudi
*Assistant Examiner* — Hubert Cheung
(74) *Attorney, Agent, or Firm* — Kwan & Olynick LLP

(57) ABSTRACT

An enhanced multidimensional data management system significantly reduces the resources required to convert a spreadsheet into an enterprise collaborative system. A spreadsheet may be imported as is without modifications. Additional information that cannot be automatically inferred about the data model used in the spreadsheet is obtained. Dimensions, timescale, and measure data are clearly defined and located. The spreadsheet is kept in the system in the form of both a spreadsheet and as a multidimensional data structure such as an online analytical processing (OLAP) cube or structure. This duality allows the spreadsheet to be manipulated as if it was an OLAP cube, modifying iterations within the dimensions, and the OLAP cube to be computed as if it was a spreadsheet.

20 Claims, 6 Drawing Sheets

Related U.S. Application Data continuation of application No. 14/754,442, filed on Jun. 29, 2015, now Pat. No. 9,817,876.

(51) Int. Cl.
  *G06F 16/28* (2019.01)
  *G06F 40/18* (2020.01)

(56) References Cited

U.S. PATENT DOCUMENTS

| | | |
|---|---|---|
| 6,292,810 B1 | 9/2001 | Richards |
| 6,604,110 B1 | 8/2003 | Savage et al. |
| 6,610,102 B1 | 8/2003 | Aldred et al. |
| 6,754,677 B1 | 6/2004 | Cho et al. |
| 7,861,253 B1 | 12/2010 | Lettington et al. |
| 8,510,266 B1 | 8/2013 | Ho et al. |
| 9,817,876 B2 | 11/2017 | Demonsant et al. |
| 10,503,822 B1 | 12/2019 | Spencer et al. |
| 11,204,934 B2 | 12/2021 | Demonsant et al. |
| 2002/0029207 A1* | 3/2002 | Bakalash .......... G06F 16/24539 |
| 2002/0129106 A1 | 9/2002 | Gutfreund |
| 2003/0009649 A1 | 1/2003 | Martin et al. |
| 2004/0237029 A1* | 11/2004 | Medicke .................. G06F 40/18 715/255 |
| 2005/0154779 A1 | 7/2005 | Cypher et al. |
| 2006/0015806 A1 | 1/2006 | Wallace |
| 2006/0024653 A1 | 2/2006 | Battagin et al. |
| 2006/0085444 A1 | 4/2006 | Sarawgi et al. |
| 2006/0112123 A1 | 5/2006 | Clark et al. |
| 2007/0061344 A1 | 3/2007 | Dickerman et al. |
| 2007/0088691 A1* | 4/2007 | Dickerman ............. G06F 40/18 707/999.005 |
| 2007/0162504 A1* | 7/2007 | Chivukula .............. G06F 40/18 |
| 2007/0233811 A1* | 10/2007 | Rochelle ................. H04L 67/01 709/219 |
| 2008/0016041 A1 | 1/2008 | Frost et al. |
| 2008/0243763 A1 | 10/2008 | Bishop et al. |
| 2008/0294612 A1 | 11/2008 | Wiles |
| 2009/0204455 A1 | 8/2009 | Rubin |
| 2009/0210430 A1 | 8/2009 | Averbuch et al. |
| 2009/0319553 A1 | 12/2009 | Le Brazidec et al. |
| 2010/0042634 A1 | 2/2010 | Lamm |
| 2010/0057700 A1* | 3/2010 | Williamson .......... G06F 16/283 707/E17.014 |
| 2011/0099143 A1 | 4/2011 | Battagin et al. |
| 2012/0173476 A1 | 7/2012 | Rizvi |
| 2012/0179644 A1* | 7/2012 | Miranker ............ G06F 16/9024 707/812 |
| 2012/0192052 A1* | 7/2012 | Caplan .................... G06F 40/18 715/219 |
| 2013/0246340 A1* | 9/2013 | Bender ................. G06F 16/283 707/602 |
| 2014/0310231 A1* | 10/2014 | Sampathkumaran ........................ G06F 16/254 707/602 |
| 2014/0372850 A1 | 12/2014 | Campbell et al. |
| 2014/0372857 A1 | 12/2014 | Otero et al. |
| 2015/0026116 A1* | 1/2015 | Bharti ................... G06F 16/284 707/602 |
| 2015/0199378 A1* | 7/2015 | Reyntjens ................ G06N 5/00 707/754 |
| 2016/0378842 A1 | 12/2016 | Demonsant et al. |
| 2018/0150531 A1 | 5/2018 | Demonsant et al. |

OTHER PUBLICATIONS

Matei, "An Integrated Approach to Deliver OLAP for Multidimensional Semantic Web Databases", Coventry University, 2015 (Year: 2015).*

Bendre M, Sun B, Zhang D, Zhou X, Chang KC, Parameswaran A. DataSpread: Unifying Databases and Spreadsheets. Proceedings VLDB Endowment. Aug. 2015;8(12):2000-2003. PMID: 26900487; PMCID: PMC4756475. (Year: 2015).*

Eirik Bakke, David Karger, and Rob Miller. 2011. A spreadsheet-based user interface for managing plural relationships in structured data. In Proceedings of the SIGCHI Conference on Human Factors in Computing Systems (CHI '11). Association for Computing Machinery, New York, Ny, USA, 2541â2550. (Year: 2011).*

"International Application Serial No. PCT/US16/38934, Search Report and Written Opinion dated Oct. 13, 2016", 10 pages.

U.S. Appl. No. 15/666,740, Notice of Allowance and Fees Due (Ptol-85), Apr. 14, 2020, 10 pgs.

U.S. Appl. No. 15/730,639, Advisory Action (Ptol-303), Jun. 18, 2020, 2 pgs.

U.S. Appl. No. 15/730,639, Final Rejection, Apr. 14, 2020, 16 pgs.

U.S. Appl. No. 15/730,639, Non-Final Rejection, Sep. 1, 2020, 16 pgs.

U.S. Appl. No. 15/730,639, Non-Final Rejection, Dec. 4, 2019, 12 pgs.

U.S. Appl. No. 15/730,639, Office Action Appendix, Jun. 18, 2020, 2 pgs.

U.S. Appl. No. 15/730,639, USPTO e-Office Action: OA.Appendix—Office Action Appendix, Jun. 5, 2020, 2 pgs.

U.S. Appl. No. 14/754,442, Advisory Action mailed Sep. 29, 2016, 6pgs.

U.S. Appl. No. 14/754,442, Examiner Interview Summary mailed May 26, 2016, 4pgs.

U.S. Appl. No. 14/754,442, Examiner Interview Summary mailed Jun. 9, 2017, 3pgs.

U.S. Appl. No. 14/754,442, Examiner Interview Summary mailed Sep. 29, 2016, 3pgs.

U.S. Appl. No. 14/754,442, Final Office Action mailed Jul. 6, 2016, 17pgs.

U.S. Appl. No. 14/754,442, Non Final Office Action mailed Feb. 9, 2016, 17pgs.

U.S. Appl. No. 14/754,442, Non Final Office Action mailed Mar. 20, 2017, 19pgs.

U.S. Appl. No. 14/754,442, Notice of Allowance mailed Jul. 12, 2017, 9pgs.

U.S. Appl. No. 15/730,639, Corrected Notice of Allowance malled Nov. 23, 2021, 8 pgs.

U.S. Appl. No. 15/730,639, Examiner Interview Summary mailed Aug. 4, 2021, 1 pg.

U.S. Appl. No. 15/730,639, Non-Final Office Action mailed Feb. 23, 2021, 11 pgs.

U.S. Appl. No. 15/730,639, Notice of Allowance mailed Aug. 4, 2021, 10 pgs.

Erik Thomsen, OLAP Solutions: Building Multidimensional Information Systems, Second Edition (Year: 2002).

International Application Serial No. PCT/US16/38934, Search Report and Written Opinion mailed Oct. 13, 2016, 10pgs.

Paris Technologies, PowerOLAP Quick Start Manual (Year: 2014).

Svetlana Mansmann, Extending the Multidimensional Data Model to Handle Complex Data (Year: 2007).

* cited by examiner

Spreadsheet 301

Tools | ▽New... | ☑Outline dimensions | Update the workbook
 | Reset | Build Data Model | Export the workbook ▽ Country 321 ▶

Dimensions 311     Measures 313     Timescales 315

| | A | B | C | D | E | F | G |
|---|---|---|---|---|---|---|---|
| 1 | Country 321 | Product 323 | | 2,016 | 2,017 | 2,018 | 2,019 |
| 2 | | | | | | | |
| 3 | US | P1 | Sales 331 | 153,600 | 148,733 | 165,121 | 164,656 |
| 4 | | | Cost of Sales 333 | 123,000 | 121,302 | 126,911 | 170,000 |
| 5 | | | Gross Profit 335 | 30,600 | 27,431 | 38,210 | -5,344 |
| 6 | | | Gross Margin 337 | 20% | 18% | 23% | -3% |
| 7 | | | | | | | |
| 8 | US | P2 | Sales 331 | 172,000 | 153,000 | 172,121 | 183,656 |
| 9 | | | Cost of Sales 333 | 143,000 | 119,002 | 131,000 | 145,000 |
| 10 | | | Gross Profit 335 | 29,000 | 33,998 | 41,121 | 38,656 |
| 11 | | | Gross Margin 337 | 17% | 22% | 24% | 21% |
| 12 | | | | | | | |
| 13 | FR | P1 | | | 160,000 | 174,500 | 165,400 |
| 14 | | | | | 131,302 | 125,600 | 175,400 |
| 15 | | | | | 28698 | 48,900 | -10,000 |
| 16 | | | | | 18% | 28% | -6% |

New...
Add Selection To...

⚐ Dimension 311
▤ Measure 313
🗓 Timescale 315

Figure 3

| Tools | ▼New ... | ☑Outline dimensions | Update the workbook | | | | Spreadsheet 401 |
|---|---|---|---|---|---|---|---|
| | Reset | | Build Data Model | Export the workbook | | | |

| Product 423 ▶ | | Country 421 ▶ | | | Measures 413 | | | Timescales 415 |
|---|---|---|---|---|---|---|---|---|
| | | Dimensions 411 | | | | | | |

| | A | B | C | D | E | F | G | |
|---|---|---|---|---|---|---|---|---|
| 1 | Country 421 | Product 423 | | 2,016 | | | 2,019 | ⬚ Dimension 411 |
| 2 | | | | | | New ... | | 🗐 Measure 413 |
| 3 | US | P1 | Sales 431 | 153,600 | | 🗐 Add Selection To ... | | 🔲₅ Timescale 415 |
| 4 | | | Cost of Sales 433 | 123,000 | | 121,502 | | |
| 5 | | | Gross Profit 435 | 30,600 | 27,431 | 38,2 | 183,656 | -3% |
| 6 | | | Gross Margin 437 | 20% | 18% | 23% | | |
| 7 | | | | | | | | |
| 8 | US | P2 | Sales 431 | 172,000 | 153,000 | 172,121 | 183,656 | |
| 9 | | | Cost of Sales 433 | 143,000 | 119,002 | 131,000 | 145,000 | |
| 10 | | | Gross Profit 435 | 29,000 | 33,998 | 41,121 | 38,656 | |
| 11 | | | Gross Margin 437 | 17% | 22% | 24% | 21% | |
| 12 | | | | | | | | |
| 13 | FR | P1 | Sales 431 | 153,500 | 160,000 | 174,500 | 165,400 | |
| 14 | | | Cost of Sales 433 | 134,200 | 131,302 | 125,600 | 175,400 | |
| 15 | | | Gross Profit 435 | 19,300 | 28698 | 48,900 | -10,000 | |
| 16 | | | Gross Margin 437 | 20% | 18% | 28% | -6% | |

Figure 4

| Tools | ▶ New ... | ☑ Outline dimensions | Update the workbook | | | | Spreadsheet 501 |
|---|---|---|---|---|---|---|---|
| | Reset | | Build Data Model | Export the workbook | | | |

| Product 523 ▶ | | Country 521 ▶ | | Sales, Cost of sales, Gross Profit, Gross margin ▶ | | Year 541 ▶ | |
|---|---|---|---|---|---|---|---|
| | | Dimensions 511 | | Measures 513 | | | Timescales 515 |

| | A | B | C | D | E | F | G |
|---|---|---|---|---|---|---|---|
| 1 | Country 521 | Product 523 | | 2,016 | 2,017 | 2,018 | 2,019 |
| 2 | | | | | | | |
| 3 | US | P1 | Sales 531 | 153,600 | 148,733 | 165,121 | 164,656 |
| 4 | | | Cost of Sales 533 | 123,000 | 121,302 | 126,911 | 170,000 |
| 5 | | | Gross Profit 535 | 30,600 | 27,431 | 38,210 | -5,344 |
| 6 | | | Gross Margin 537 | 20% | 18% | 23% | -3% |
| 7 | | | | | | | |
| 8 | US | P2 | Sales 531 | 172,000 | 153,000 | 172,121 | 183,656 |
| 9 | | | Cost of Sales 533 | 143,000 | 119,002 | 131,000 | 145,000 |
| 10 | | | Gross Profit 535 | 29,000 | 33,998 | 41,121 | 38,656 |
| 11 | | | Gross Margin 537 | 17% | 22% | 24% | 21% |
| 12 | | | | | | | |
| 13 | FR | P1 | Sales 531 | 153,500 | 160,000 | 174,500 | 165,400 |
| 14 | | | Cost of Sales 533 | 134,200 | 131,302 | 125,600 | 175,400 |
| 15 | | | Gross Profit 535 | 19,300 | 28698 | 48,900 | -10,000 |
| 16 | | | Gross Margin 537 | 13% | 18% | 28% | -6% |

Figure 5

ENHANCED MECHANISMS FOR MANAGING MULTIDIMENSIONAL DATA

CROSS-REFERENCE TO RELATED APPLICATIONS

This application is a continuation of and claims priority to U.S. patent application Ser. No. 15/730,639, filed Oct. 11, 2017 by Pierre Demonsant, entitled "ENHANCED MECHANISMS FOR MANAGING MULTIDIMENSIONAL DATA," which is a continuation of and claims priority to U.S. patent application Ser. No. 14/754,442, filed Jun. 29, 2015 by Pierre Demonsant, entitled "ENHANCED MECHANISMS FOR MANAGING MULTIDIMENSIONAL DATA," now Issued under U.S. Pat. No. 9,817,876 on Nov. 14, 2017 both of which are incorporated by reference herein in its entirety and for all purposes.

TECHNICAL FIELD

The present disclosure relates to generating, managing, maintaining, and manipulating multidimensional data.

DESCRIPTION OF RELATED ART

Numerous entities maintain and manipulate multidimensional data by using spreadsheets. Spreadsheets have been widely adopted because they can be easily implemented by people who do not have an information technology (IT) background, reducing the need to have people with both business logic familiarity and technology expertise. However, large scale organizational and corporate systems relying on spreadsheets have a number of drawbacks.

For example, spreadsheet based systems lack of collaborative capabilities, suffer from version management deficiencies, do not scale well, and are prone to bugs. That is, adding significant amounts of data or a large number of users can stress a spreadsheet based system. Multiple different subgroups within an organization cannot easily synchronize versions and changes. Furthermore, spreadsheet systems are prone to errors since the business logic is not separated from the data imposing the logic to be repeated independently on every cell composing the spreadsheet. Auditability is poor as it takes a considerable amount of time to understand the business logic involved in a spreadsheet. Versioning is not natively supported inside the spreadsheet. For example, a spreadsheet does not track when the content of a cell is modified, i.e. only the new value is kept and the old value is lost.

Nevertheless, because of the simplicity in their implementation, spreadsheets very often correspond to a first attempt of addressing a business problem in an automated fashion. They are logically seen as a very precious source of information for IT people when implementing a more robust IT system as soon as the inconveniences of using spreadsheets are too restrictive. When building an IT solution, a lot of effort can be dedicated to analyzing the information in spreadsheets and to replicating the exact same results obtained by them. This process usually results in the discovery of many bugs and the slow convergence between the two systems.

Consequently, it is desirable to provide enhanced mechanisms for managing multidimensional data including mechanisms for analyzing, generating, manipulating, and maintaining multidimensional data in spreadsheet form and as multidimensional data structures that overcome some of the drawbacks of conventional systems.

OVERVIEW

An enhanced multidimensional data management system significantly reduces the resources required to convert a spreadsheet into an enterprise collaborative system. A spreadsheet may be imported as is without modifications. Additional information that cannot be automatically inferred about the data model used in the spreadsheet is input. Dimensions, timescale, and measure data are clearly defined and located. The spreadsheet is kept in the system in the form of both a spreadsheet and as a multidimensional data structure such as an online analytical processing (OLAP) cube or structure. A mapping produces a bi-directional link between the spreadsheet and the dimensions and iterations of an OLAP cube. This duality allows the spreadsheet to be manipulated as if it was an OLAP cube, modifying iterations within the dimensions, and the OLAP cube to be computed as if it was a spreadsheet.

BRIEF DESCRIPTION OF THE DRAWINGS

The disclosure may best be understood by reference to the following description taken in conjunction with the accompanying drawings, which illustrate particular embodiments of the present invention.

FIG. 3 illustrates one example of entry of dimension information during importation of a spreadsheet.

FIG. 4 illustrates one example of entry of timescale information during importation of a spreadsheet.

FIG. 5 illustrates one example of entry of measures during importation of a spreadsheet.

DETAILED DESCRIPTION

Figure 1:
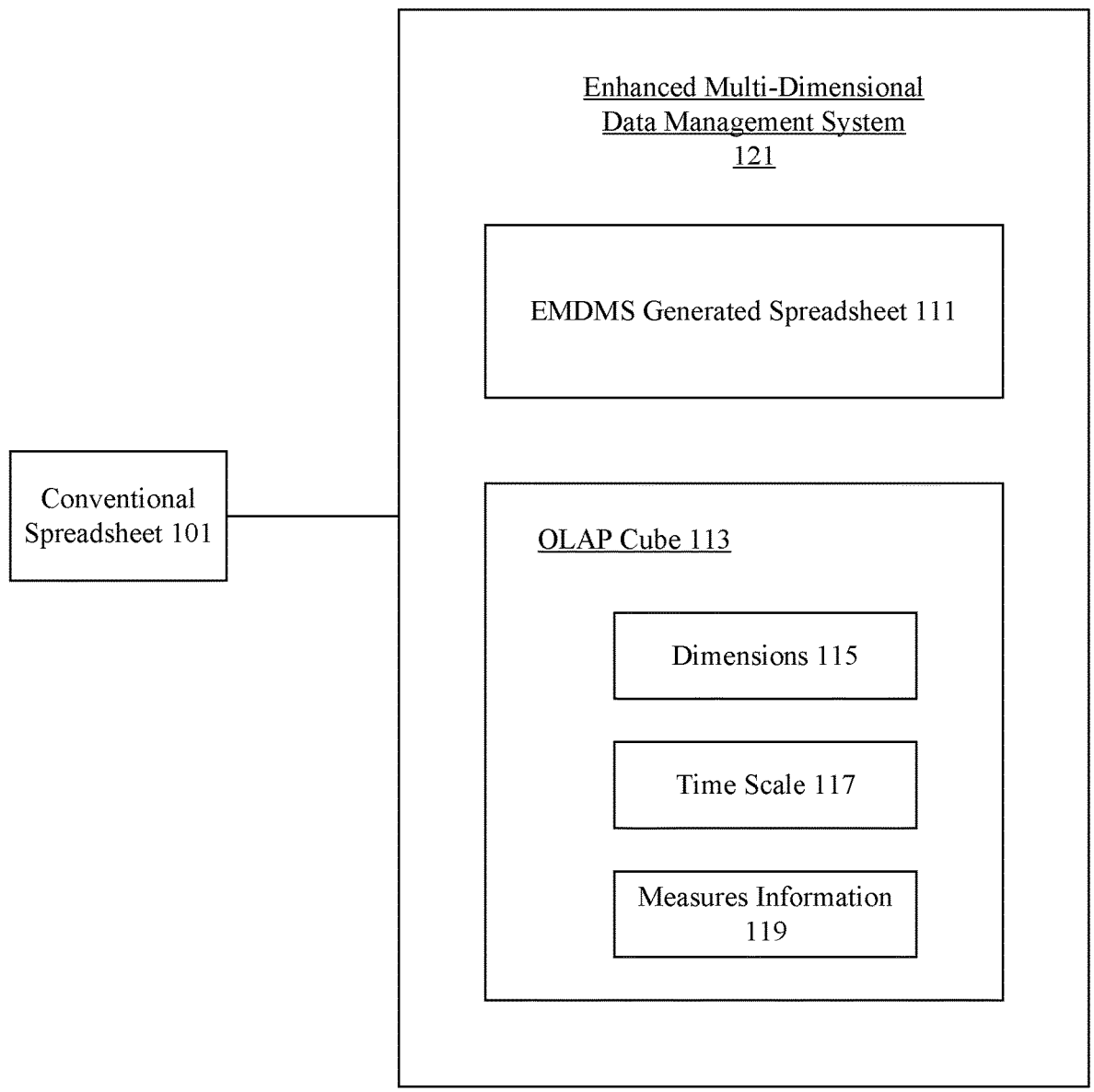
FIG. 1 illustrates one example of a spreadsheet and OLAP cube duality.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular data structures such as online analytical processing (OLAP) cubes. However, it should be noted that the techniques of the present invention apply to a wide variety of different data structures and different types of multidimensional data. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity.

However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Various organizations and enterprises rely on spreadsheets to organize, manipulate, and manage business data and logic. Spreadsheets are accessible to people without technology backgrounds because of their ease of use and relatively friendly user experiences. Spreadsheets have been widely adopted because they can be easily implemented by people who do not have an information technology (IT) background, reducing the need to have people with both business logic familiarity and technology expertise. Spreadsheets from certain vendors also have fairly robust ecosystems with add-ons and tools designed for use with those spreadsheets. However, conventional spreadsheets have a number of limitations. For example, spreadsheet based business systems lack collaborative capabilities. It is typically burdensome and error prone for different departments and different people to work on the same spreadsheet simultaneously. Individual spreadsheet files may be locked and unlocked for particular users, but this limits manipulation of the spreadsheet to a single user. If multiple versions of the same spreadsheet file are manipulated simultaneously, there is no easy way to synchronize the cells of the different spreadsheet files, even if there are technically no cell conflicts. Although spreadsheets can sometimes be shared, spreadsheet cells have no versioning mechanism, even if some outside tools may support versioning. For example, most third-party versioning and revision control tools can generate graphs of revisions and commits to allow tracking and comparison of modifications. However, they are difficult to use without technical skills. Although it may be difficult for many people from different departments to work independently on the same business data or logic maintained in spreadsheet files, it is even more difficult for many people to work together on the same cells, data, and logic within a spreadsheet simultaneously.

Collaborative limitations become even more apparent as an enterprise system is scaled. Many conventional spreadsheet based systems are not designed to scale and extensive efforts are required to allow them to grow as a business grows. Many spreadsheet based systems are designed to allow only one person to use the spreadsheet at a time. Data errors, business logic errors, and copy and paste errors become increasingly common because spreadsheets lack scaling, tracking, and validation mechanisms necessary for large systems. Auditability is poor as it takes a considerable amount of time to understand the business logic involved in a spreadsheet. Versioning is not natively supported inside the spreadsheet. For example, a spreadsheet does not track when the content of cell is modified and when the old value is forgotten. What-if analyses, where the business logic is applied to many datasets and the results compared to one another, may be possible only if they are originally included in the design of the spreadsheet.

Consequently, various embodiments of the present invention provide enhancements that allow more efficient and effective management of multi-dimensional data. According to various embodiments, an enhanced multidimensional data management system significantly reduces the resources required to convert a spreadsheet into an enterprise collaborative system. A spreadsheet may be imported as is without modifications. Additional information that cannot be automatically inferred about the data model used in the spreadsheet is collected from the user. Dimensions, timescale, and measure data along with other types of data as well as outputs can be clearly defined and located. The spreadsheet is kept in the system in the form of both a spreadsheet and as a multidimensional data structure such as an online analytical processing (OLAP) cube. A bidirectional mapping between the spreadsheet and the multidimensional data structure is maintained. This duality and bidirectional mapping allows the spreadsheet to be manipulated as if it was an OLAP cube, modifying iterations within the dimensions, and the OLAP cube to be computed as if it was a spreadsheet.

An existing spreadsheet can be kept as is. An enhanced multidimensional data management system is able to handle a variety of spreadsheets that were not initially designed with the objective of potential enhancements and modifications. Once the spreadsheet is imported into an enhanced multidimensional data management system, typical limitations due to the usage of spreadsheets vanish. The ability to collaborate between a large number of people is enhanced.

According to various embodiments, FIG. 1 shows one example of a spreadsheet and OLAP cube duality. Spreadsheet 101 may be part of a conventional business system maintaining both business data and business logic. An organization may wish to expand and enhance business system functionality. Some multidimensional management systems require importation and conversion of spreadsheet business data and business logic into their own proprietary formats. Conversion can often be problematic as data and logic may be lost or converted incorrectly. Formula translations from a conventional spreadsheet to an enhanced data management system may be error prone or imprecise. Nonetheless, some entities will exert Herculean efforts to convert conventional spreadsheet based solutions to proprietary enhanced spreadsheet or enhanced data management systems. However, even if the conversion process goes smoothly, the entity is still left with a proprietary system that may not have the support of $3^{rd}$ party vendors, may not be associated with a robust ecosystem, and may not be compatible with other existing entity resources.

It may be possible to convert proprietary system data back into a conventional spreadsheet format, but the conversion is again potentially error prone or imprecise. Furthermore, the reimport of these exported spreadsheets can also be problematic. Consequently, various embodiments of the present invention provide mechanisms for maintaining a conventional spreadsheet along with providing enhanced multi-dimensional data management functionality. According to various embodiments, conventional spreadsheet 101 may be maintained as both a spreadsheet 111 and an OLAP cube 113 in an enhanced multi-dimensional data management system (EMDMS) 121. Spreadsheet 111 in an enhanced multi-dimensional data management system 121 is also referred to herein as a server side generated spreadsheet or an enhanced multi-dimensional data management system generated spreadsheet. In particular example embodiments, the OLAP cube 113 includes dimensions 115, time scale 117 and measures information 119. According to various embodiments, changes made to the enhanced multi-dimensional data management system 121 are made both to the OLAP cube 113 and to the spreadsheet 111. In particular example embodiments, the enhanced multi-dimensional data management system 121 is associated with a server side spreadsheet engine compatible with standard format OpenXML. There is a bidirectional mapping between the spreadsheet engine and the OLAP structure or OLAP cube 113.

Figure 2:
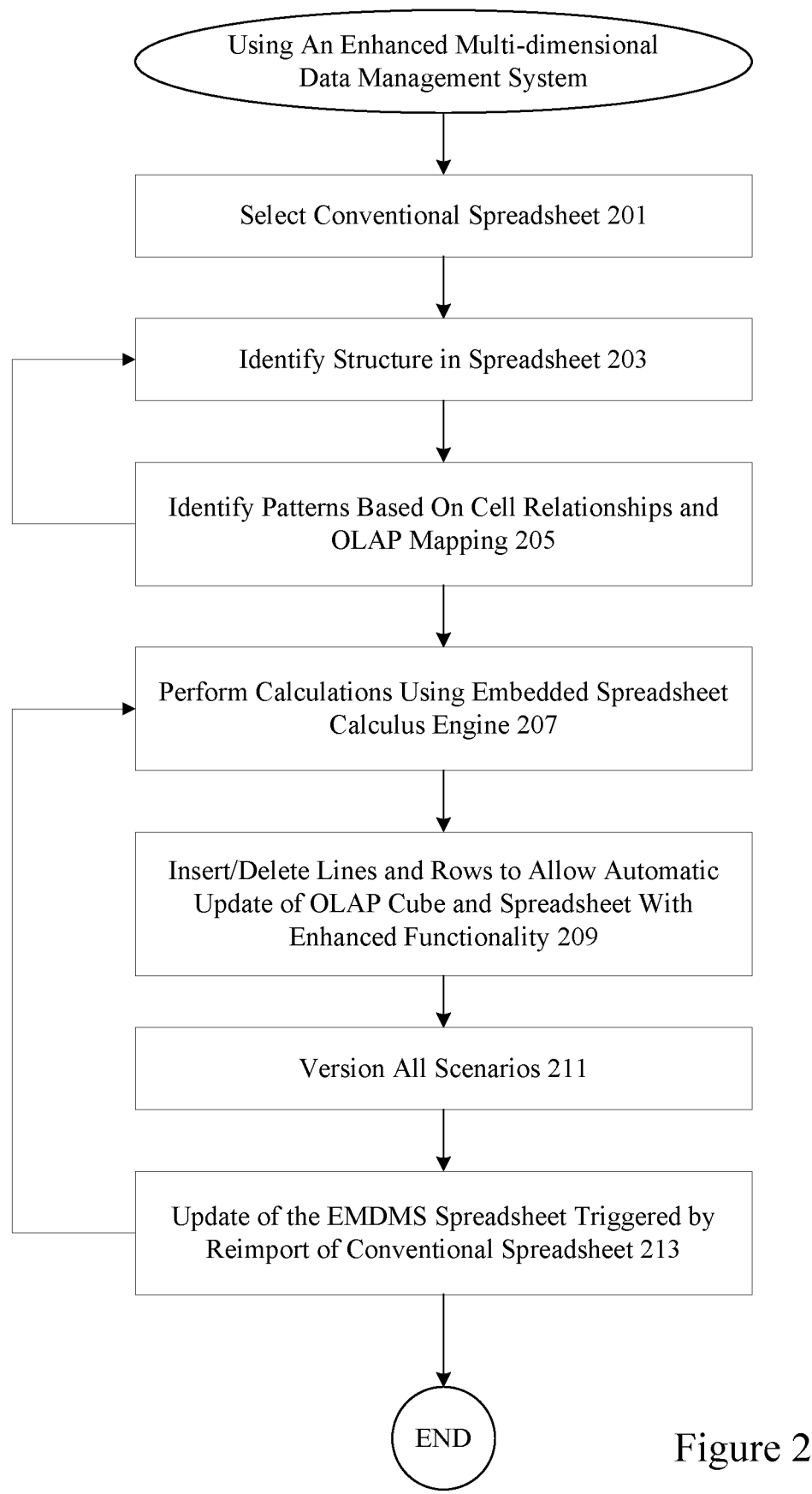
FIG. 2 illustrates one example of a flow process diagram.

FIG. 2 illustrates one example of a flow process diagram for using an enhanced multi-dimensional data management system. In particular example embodiments, a conventional spreadsheet is selected for import into an enhanced multi-dimensional data management system at 201. According to various embodiments, at 203, the structure in the spreadsheet is identified based on cell formula and cell location as well as information provided by users and/or information already stored in a target system, e.g. referential data. Patterns can be identified based on cell relationships and OLAP mapping at 205. The user can then correct the model by redefining the identified structure between 203 and 205. According to various embodiments, calculations are performed using an embedded spreadsheet calculus engine and no formula translations are necessary at 207.

According to various embodiments, insertion and/or deletion of lines and rows can be based on the formula pattern and the layout to allow for automatic update of both an OLAP cube and the spreadsheet with enhanced functionality at 209. Similarly, values of cells can be modified and changes can be propagated accordingly to the OLAP cube. All scenarios are versioned at 211.

In particular example embodiments, export and reimport of a conventional spreadsheet is also allowed. Reimport of the conventional spreadsheet can trigger an update of the spreadsheet computed by the enhanced multi-dimensional data management system at 213.

After re-importing the data in the spreadsheet, the OLAP can be modified and then go back in the workflow at 207 as shown by the feedback arrow from 213 to 207.

FIG. 3 illustrates one example of entry of dimension information during importation of a spreadsheet. According to various embodiments, a spreadsheet 301 computed by an enhanced multi-dimensional data management system includes dimensions 311, measures 313, and timescales 315 corresponding to elements of an OLAP cube. During importation of a spreadsheet, a user might select particular entries as dimensions. For example, country 321 and product 323 may correspond to dimensions. Spreadsheet 301 computed by the enhanced multi-dimensional data management system may also include timescale information. Examples of measures information may include sales 331, cost of sales 333, gross profit 335, and gross margin 337.

As shown in the present embodiment, the dimensions of the EMDMS spreadsheet 301 are being set, as indicated by the checked box in the tools area. A check box allows a user to switch between two different modes. In the outline dimensions mode, cells that belong to a dimension/time axis/set of measures are colored. Different dimensions/time axis/set of measures are colored differently. A user does not necessarily have to be in this mode to select dimensions/time axis/set of measures. However, it is useful since a user has an immediate overview of the cells that already are part of a dimension/time axis/set of measures. In particular, the "Outline Dimensions" box is checked, indicating that the EMDMS spreadsheet 301 is in this mode. In the present example, country 321 is already selected and listed as one of the dimensions 311, as indicated in the area listed below the tools section. A product P1, located in cell B13, is being added as a new dimension 311 from the pulldown menu shown. Once selected, this product 323 will be added to the dimensions 311 area below the tools section and above the cells.

FIG. 4 illustrates one example of entry of timescale information during importation of a spreadsheet. According to various embodiments, a spreadsheet 401 computed by an enhanced multi-dimensional data management system includes dimensions 411, measures 413, and timescales 415 corresponding to elements of an OLAP cube. During importation of a spreadsheet, a user might select particular timescales corresponding to particular time periods such as months, quarters, and years. Spreadsheet 401 may also include dimensions 411 such as country 421 and product 423. Other examples may include SKU, indications, dosage, etc. Examples of measures information may include sales 431, cost of sales 433, gross profit 435, and gross margin 437.

As shown in the present embodiment, the dimensions of the EMDMS spreadsheet 401 are being set, as indicated by the checked box in the tools area. A check box allows a user to switch between two different modes. In the outline dimensions mode, cells that belong to a dimension/time axis/set of measures are colored. Different dimensions/time axis/set of measures are colored differently. A user does not necessarily have to be in this mode to select dimensions/time axis/set of measures. However, it is useful since a user has an immediate overview of the cells that already are part of a dimension/time axis/set of measures. In particular, the "Outline Dimensions" box is checked, indicating that the EMDMS spreadsheet 401 is in this mode. In the present example, country 421 and product 423 are already selected and listed as two of the dimensions 411, as indicated in the area listed below the tools section. Timescales 415 are now being selected. In particular, the year 2017, located in cell E1, is being added as a new timescale 415 from the pulldown menu shown. Once selected, this year will be added to the timescales 415 area below the tools section and above the cells.

FIG. 5 illustrates one example of entry of measures information during importation of a spreadsheet. According to various embodiments, a spreadsheet 501 computed by an enhanced multi-dimensional data management system includes dimensions 511, measures 513, and timescales 515 corresponding to elements of an OLAP cube. During importation of a spreadsheet, a user might select particular measures corresponding to elements such as sales 531, cost of sales 533, gross profit 535, and gross margin 537. A user may also enter timescales 515 corresponding to particular time periods such as months, quarters, and years. Spreadsheet 501 may also include dimensions 511 corresponding to country 521 and product 523.

As shown in the present embodiment, the dimensions of the EMDMS spreadsheet 501 are being set, as indicated by the checked box in the tools area. A check box allows a user to switch between two different modes. In the outline dimensions mode, cells that belong to a dimension/time axis/set of measures are colored. Different dimensions/time axis/set of measures are colored differently. A user does not necessarily have to be in this mode to select dimensions/time axis/set of measures. However, it is useful since a user has an immediate overview of the cells that already are part of a dimension/time axis/set of measures. In particular, the "Outline Dimensions" box is checked, indicating that the EMDMS spreadsheet 501 is in this mode. In the present example, country 521 and product 523 are already selected and listed as two of the dimensions 511, as indicated in the area listed below the tools section. In addition, year 541 has already been selected as a timescale 515, as indicated in the timescales area 515 below the tools area and above the cells. On this screen, measures 513 have just been selected. In particular, gross profit 535, located in cell C15, has been added as a new measure 513, along with sales 531, cost of sales 533, and gross margin 537, as listed in the measures 513 area below the tools section and above the cells.

According to various embodiments, the EMDMS spreadsheet includes improved functionality over the originally imported spreadsheet. In particular, by specifying parameters such as dimensions, measures, and timescales, data is accurately mapped and can be tracked more effectively. Additionally, errors in calculations or data entry can be more easily detected. Moreover, formulas applied to particular cells can be accurately outlined using these parameters.

According to various embodiments, insertion of data into an OLAP cube will insert or remove rows and columns corresponding to the data in the EMDMS spreadsheet with appropriate formulas and styles. Existing formulas will also be modified. For example, insertion of data into the OLAP cube will change summations and totals included in the EMDMS spreadsheet.

Figure 6:
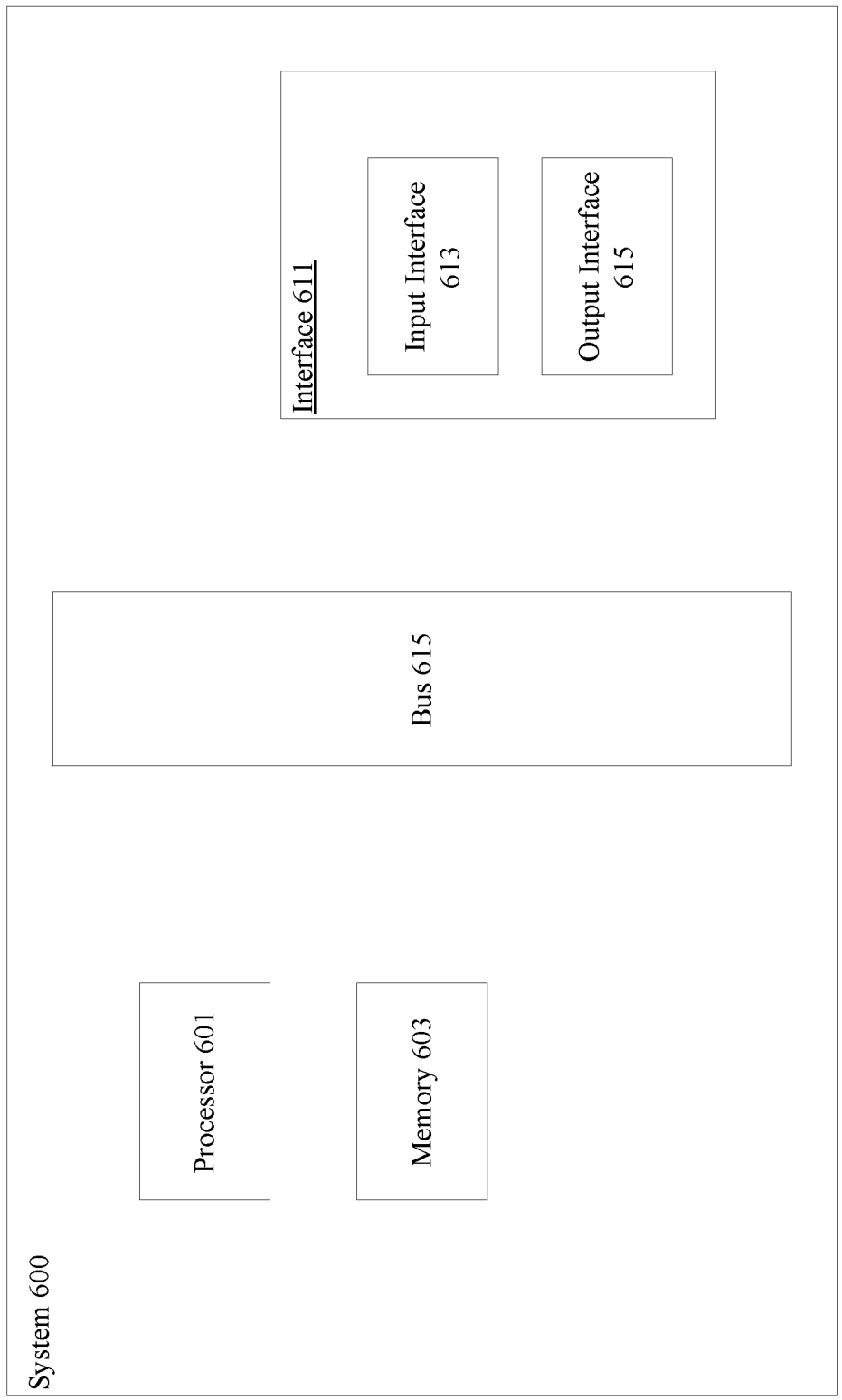
FIG. 6 illustrates one example of a computer system.

Various computing devices can implement the methods described. For instance, a mobile device, computer system, etc. can be used to generate artificially rendered images. With reference to FIG. 6, shown is a particular example of a computer system that can be used to implement particular examples of the present invention. For instance, the computer system 600 can be used to provide generate artificially rendered images according to various embodiments described above. In addition, the computer system 600 shown can represent a computing system on a mobile device. According to particular example embodiments, a system 600 suitable for implementing particular embodiments of the present invention includes a processor 601, a memory 603, an interface 611, and a bus 615 (e.g., a PCI bus). The interface 611 may include separate input interface 613 and output interface 615, or may be a unified interface supporting both operations. When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   importing a non-collaborative spreadsheet into a multi-dimensional data management system, wherein the non-collaborative spreadsheet is a spreadsheet lacking collaborative capabilities, wherein the multi-dimensional data management system accepts spreadsheets that are originally without collaborative capabilities;
   bi-directionally mapping the non-collaborative spreadsheet into two multidimensional structures: 1) an enhanced multi-dimensional data management spreadsheet (EMDS), and 2) an online analytical processing (OLAP) structure, wherein the EMDS is a spreadsheet that includes collaborative capabilities even though the non-collaborative spreadsheet is without collaborative capabilities, wherein collaborative capabilities includes the ability to support many different users working together on the same spreadsheet at the same time, wherein the spreadsheet is imported without modification into the OLAP structure and changes made to the EMDS are made both to the spreadsheet and the OLAP structure;
   maintaining a duality and bi-directional mapping between the EMDS and the OLAP structure, and wherein maintaining the duality and bi-directional mapping means changes made in the EMDS are also immediately made in the OLAP structure;
   receiving a EMDS change, modifying the EMDS according to the EMDS change and correspondingly modifying the OLAP structure according to the bi-directionally mapping; and
   receiving an OLAP change, modifying the OLAP structure according to the OLAP change and correspondingly modifying the EMDS according to the bi-directionally mapping.

2. The method of claim 1, wherein modifying iterations to dimensions/measures/timescale in an OLAP structure modifies rows/columns in the EMDS along with corresponding formulas.

3. The method of claim 1, wherein the EMDS includes a mode where cells that belong to a dimension/time axis/set of measures are colored.

4. The method of claim 1, further comprising receiving modifications to the non-collaborative spreadsheet, wherein modifications to the non-collaborative spreadsheet are propagated as modifications to the OLAP structure.

5. The method of claim 1, wherein the multi-dimensional data management system is configured to export the modifications to the non-collaborative spreadsheet.

6. The method of claim 1, further comprising updating the OLAP structure during re-import of the non-collaborative spreadsheet.

7. The method of claim 1, wherein a plurality of non-collaborative spreadsheets are modified at a plurality of client devices.

8. A non-transitory computer readable medium storing instructions to execute a method, the method comprising:
   importing a non-collaborative spreadsheet into a multi-dimensional data management system, wherein the non-collaborative spreadsheet is a spreadsheet lacking collaborative capabilities, wherein the multi-dimensional data management system accepts spreadsheets that are originally without collaborative capabilities;
   bi-directionally mapping the non-collaborative spreadsheet into two multidimensional structures: 1) an enhanced multi-dimensional data management spreadsheet (EMDS), and 2) an online analytical processing (OLAP) structure, wherein the EMDS is a spreadsheet that includes collaborative capabilities even though the non-collaborative spreadsheet is without collaborative capabilities, wherein collaborative capabilities includes the ability to support many different users working together on the same spreadsheet at the same time, wherein the spreadsheet is imported without modification into the OLAP structure and changes made to the EMDS are made both to the spreadsheet and the OLAP structure;
   maintaining a duality and bi-directional mapping between the EMDS and the OLAP structure, and wherein maintaining the duality and bi-directional mapping means changes made in the EMDS are also immediately made in the OLAP structure;
   receiving a EMDS change, modifying the EMDS according to the EMDS change and correspondingly modifying the OLAP structure according to the bi-directionally mapping; and
   receiving an OLAP change, modifying the OLAP structure according to the OLAP change and correspondingly modifying the EMDS according to the bi-directionally mapping.

9. The non-transitory computer readable medium of claim 8, wherein modifying iterations to dimensions/measures/timescale in an OLAP structure modifies rows/columns in the EMDS along with corresponding formulas.

10. The non-transitory computer readable medium of claim 8, wherein the EMDS includes a mode where cells that belong to a dimension/time axis/set of measures are colored.

11. The non-transitory computer readable medium of claim 8, further comprising receiving modifications to the non-collaborative spreadsheet, wherein modifications to the non-collaborative spreadsheet are propagated as modifications to the OLAP structure.

12. The non-transitory computer readable medium of claim 8, wherein the multi-dimensional data management system is configured to export the modifications to the non-collaborative spreadsheet.

13. The non-transitory computer readable medium of claim 8, further comprising updating the OLAP structure during re-import of the non-collaborative spreadsheet.

14. The non-transitory computer readable medium of claim 8, wherein a plurality of non-collaborative spreadsheets are modified at a plurality of client devices.

15. A system comprising:
   a processor; and
   memory, wherein the memory includes instructions for causing the processor to execute a method, the method comprising:
   importing a non-collaborative spreadsheet into a multi-dimensional data management system, wherein the non-collaborative spreadsheet is a spreadsheet lacking collaborative capabilities, wherein the multi-dimensional data management system accepts spreadsheets that are originally without collaborative capabilities;
   bi-directionally mapping the non-collaborative spreadsheet into two multidimensional structures: 1) an enhanced multi-dimensional data management spreadsheet (EMDS), and 2) an online analytical processing (OLAP) structure, wherein the EMDS is a spreadsheet that includes collaborative capabilities even though the non-collaborative spreadsheet is without collaborative capabilities, wherein collaborative capabilities includes the ability to support many different users working together on the same spreadsheet at the same time, wherein the spreadsheet is imported without modification into the OLAP structure and changes made to the EMDS are made both to the spreadsheet and the OLAP structure;
   maintaining a duality and bi-directional mapping between the EMDS and the OLAP structure, and wherein maintaining the duality and bi-directional mapping means changes made in the EMDS are also immediately made in the OLAP structure;
   receiving a EMDS change, modifying the EMDS according to the EMDS change and correspondingly modifying the OLAP structure according to the bi-directionally mapping; and
   receiving an OLAP change, modifying the OLAP structure according to the OLAP change and correspondingly modifying the EMDS according to the bi-directionally mapping.

16. The system of claim 15, wherein modifying iterations to dimensions/measures/timescale in an OLAP structure modifies rows/columns in the EMDS along with corresponding formulas.

17. The system of claim 15, wherein the EMDS includes a mode where cells that belong to a dimension/time axis/set of measures are colored.

18. The system of claim 15, further comprising receiving modifications to the non-collaborative spreadsheet, wherein modifications to the non-collaborative spreadsheet are propagated as modifications to the OLAP structure.

19. The system of claim 15, wherein the multi-dimensional data management system is configured to export the modifications to the non-collaborative spreadsheet.

20. The system of claim 15, further comprising updating the OLAP structure during re-import of the non-collaborative spreadsheet.

* * * * *